(12) United States Patent
Schöb et al.

(10) Patent No.: US 6,297,574 B1
(45) Date of Patent: Oct. 2, 2001

(54) MAGNETIC BEARING APPARATUS

(75) Inventors: Reto Schöb, Volketswil; Peter Jenckel; Hans-Georg Reiter, both of Zürich, all of (CH)

(73) Assignee: Lust Antriebstechnik GmbH, Lahnau (DE)

( * ) Notice: Subject to any disclaimer, the term of this patent is extended or adjusted under 35 U.S.C. 154(b) by 0 days.

(21) Appl. No.: 09/383,484

(22) Filed: Aug. 26, 1999

(30) Foreign Application Priority Data

Sep. 24, 1998 (EP) .................................................. 98810956

(51) Int. Cl.[7] ............................ H02K 7/09; H02K 11/00; H02K 17/42; H02P 5/28; H02P 5/34
(52) U.S. Cl. ...................... 310/90.5; 310/68 B; 310/168; 318/798; 318/800; 318/801; 318/806
(58) Field of Search .................................. 310/90.5, 68 B, 310/166, 168; 361/139, 143, 159; 318/830, 798, 799, 800, 801, 802, 803, 805, 806, 496

(56) References Cited

U.S. PATENT DOCUMENTS

| | | | |
|---|---|---|---|
| 4,988,939 | * 1/1991 | Reichard et al. | 318/800 |
| 5,155,402 | 10/1992 | Bichler | 310/90.5 |
| 5,262,692 | * 11/1993 | Williams et al. | 310/90.5 |
| 5,300,841 | 4/1994 | Preston | 310/90.5 |
| 5,323,075 | * 6/1994 | Denk et al. | 310/68 B |
| 5,424,595 | 6/1995 | Preston | 310/90.5 |
| 5,543,673 | 8/1996 | Katsumata | 310/90.5 |
| 5,578,880 | 11/1996 | Lyons | 310/90.5 |
| 5,608,278 | * 3/1997 | Mey et al. | 310/90 |
| 5,821,656 | * 10/1998 | Colby et al. | 310/90.5 |

FOREIGN PATENT DOCUMENTS

WO 97/07340 2/1997 (WO).
WO 97/08808 3/1997 (WO).

* cited by examiner

*Primary Examiner*—Nestor Ramirez
*Assistant Examiner*—Dang Dinh Le
(74) *Attorney, Agent, or Firm*—Townsend and Townsend and Crew LLP

(57) ABSTRACT

A magnetic bearing apparatus for the journalling of a body (3), in particular of a rotor (3), comprises a stator (2) with a control winding (22) having at least three loops (22a, 22b, 22c) for the production of a magnetic control field by means of which the position of the body (3) relative to the stator (2) can be regulated, with each loop (22a, 22b, 22c) belonging to a different electrical phase, and a control device (4) which in a first operating mode supplies each loop (22a, 22b, 22c) with in each case a phase current (Ia, Ib, Ic) or in each case a phase voltage (Ua, Ub, Uc) as a control parameter. Means are provided in order to regulate the control parameter for each loop (22a, 22b, 22c) independently of the control parameter for the other loops (22a, 22b, 22c) as well as a monitoring unit (5) which can switch the bearing apparatus into a second operating mode in which a reduced number of phases, which is at least two, produces the magnetic control field.

16 Claims, 11 Drawing Sheets

MAGNETIC BEARING APPARATUS

BACKGROUND OF THE INVENTION

The invention relates to a magnetic bearing apparatus for the journalling of a body, in particular of a rotor, in accordance with the preamble of the independent patent claim.

Magnetic bearing apparatuses for the non-contact journalling of bodies, such as for example rotors of electric motors, rotating shafts, pump rotors or non-rotating bodies, are increasingly gaining in importance. Bearing apparatuses of this kind typically comprise a stator, which is provided with at least one electrical winding by means of which a magnetic control field can be produced and regulated. By means of this regulatable control field, magnetic forces are exerted on the rotating or levitating body to be journalled which hold the latter without contact in a desired position relative to the stator.

A magnetic bearing is disclosed in WO-A-97/07340, the stator of which comprises a three-phase rotary current winding for the production of the magnetic control field. The radial magnetic bearing forces are produced through the superposition of a unipolar magnetic field on this rotary field.

In WO-A-95/18925 a special form of a magnetic bearing apparatus is disclosed, namely a so-called bearing-free motor. A bearing-free motor is an electromagnetic rotary drive in which the rotor is journalled with respect to the stator without contact by means of magnetic forces. The characteristic to which the bearing-free motor owes its name is that the stator is designed as a bearing and drive stator and the rotor both as a bearing and drive stator and as a drive rotor. This means that in a bearing-free motor the magnetic bearing and the drive device form an inseparable physical unit. Separate magnetic bearings or separate drive apparatuses for the rotor are not provided. As a consequence, the so-called bearing-free motor is also a magnetic bearing apparatus with an integrated rotary drive.

The bearing and drive stator of a bearing-free motor is designed or, respectively, provided with windings in such a manner that it produces an electromagnetic rotary field which, on the one hand, exerts a torque on the rotor which drives its rotation about the axis of rotation, and which, on the other hand, exerts a transverse force on the rotor which can be set as desired so that its radial position relative to a plane perpendicular to the axis of rotation can be predetermined or actively regulated respectively. For this the electrical windings of the stator—as for example has already been disclosed in the already cited WO-A-95/18925—comprises a drive winding with the number of pole pairs p and a control winding with the number of pole pairs p±1 for the production of a magnetic control field. An electromagnetic rotary field can be produced with these two windings which exerts both a driving torque and also a transverse force which can be set as desired on the rotor. The rotor can thus be actively controlled or regulated respectively with respect to three degrees of freedom, namely the rotation about the axis of rotation A and its radial position relative to a plane perpendicular to the axis of rotation (two degrees of freedom). With respect to three further degrees of freedom, namely its axial deflection in the direction of the axis of rotation and tiltings relative to the plane perpendicular to the axis of rotation A (two degrees of freedom) the rotor is passively magnetically, that is, not controllably, stabilized by reluctance forces.

The term "bearing-free motor" is to be understood in this sense for the following explanations. Reference is made here to WO-A-95/18925 for further details of the design and especially the control or regulation respectively of the bearing-free motor.

In the bearing-free motor in accordance with WO-A-95/18925 the control winding for the production of the magnetic control field by means of which the radial position of the rotor is regulated can also be designed as a three-phase winding in a manner similar to that disclosed in WO-A-97/07340 for the magnetic bearing. In the last named publication several reasons are also mentioned why it is advantageous to design the control winding as a three-phase rotary current winding.

A problem with known magnetic bearing apparatuses is that when faults arise, such as for example the failure of an amplifier stage or the breakage of an electrical line in one of the phases of the control winding, a correct functioning of the bearing apparatus is no longer given. This can represent a safety hazard in particular in very sensitive applications, e.g. in blood pumps.

SUMMARY OF THE INVENTION

An object of the invention is thus to provide a magnetic bearing apparatus which still enables a correct operation even when faults arise, which means in particular a reliable magnetic journalling of the body to be journalled.

The magnetic bearing apparatus of the invention thus comprises a stator with a control winding having at least three loops for the production of a magnetic control field by means of which the position of the body relative to the stator can be regulated, with each loop belonging to a different electrical phase, as well as a control device which in a first operating mode supplies each loop with in each case a phase current or in each case a phase voltage as a control parameter. Means are provided in order to regulate the control parameter for each loop independently of the control parameter for the other loops. Furthermore, a monitoring unit is provided which can switch the bearing apparatus into a second operating mode in which a reduced number of phases, which is at least two, produces the magnetic control field.

The bearing apparatus in accordance with the invention can thus be operated in two operating modes. In the first operating mode the magnetic control field is generated by all three phases of the three or higher phase control winding, that is, by all their loops. In the second operating mode the magnetic control field is only produced with a reduced number of phases, which amounts to at least two however.

Thus all the loops of the control winding are no longer used; one or more loops of the control winding are "switched off" in this second operating mode. A two-phase control winding is namely sufficient in order to generate the control field which is required for the regulation of the radial position of the body relative to the stator. For this it is however necessary that the two phase currents or phase voltages can be regulated independently of one another.

Through the two operating modes it is possible to operate the bearing apparatus with a reduced number of phases when a fault arises in one of the phases, for example in the event of the failure of a winding loop as a result of a break in the line or of a short circuit or in the event of the failure of the amplifier which supplies this phase, without concessions on the correct functioning of the magnetic bearing being necessary. This error tolerance, namely that of ensuring a reliable operation of the magnetic journalling even in the event of the failure of one phase, represents an enormous increase in the operating safety in comparison with other magnetic bearings.

The monitoring unit preferably monitors the functioning of each individual phase and, in the event of a failure in one phase, switches the bearing apparatus over into the second operating mode in which only the phases without faults still produce the magnetic control field.

As has already been mentioned it is necessary for the case that the control winding is operated in only two phases any longer that the phase current or the phase voltage can be regulated in the two loops of the control winding independently of one another. Usually the phase currents or the phase voltages for the individual phases are provided by an amplifier unit which is contained in the device.

In a first preferred embodiment the means for the independent regulation of the control parameter (phase current or phase voltage) comprise a star point which is capable of loading, to which each phase is connected and which is placed at a potential which lies between the two operating potentials of the amplifier unit. In usual three-phase control windings the three loops are in each case connected to a common star point, with it being necessary to fulfill the condition that the sum of the phase currents is zero at the star point. Through the measure of making the star point capable of loading, this condition can be removed so that each phase current or each phase voltage respectively can be regulated independently of the others.

In a second preferred embodiment of the invention the amplifier unit comprises as means for the independent regulation of the control parameter (phase current or phase voltage) a separate power amplifier for each phase, with the separate power amplifiers being designed in particular as an H-bridge circuit. This measure also enables an independent regulation of the individual phase currents or phase voltages.

In accordance with a further leading aspect of the invention, the magnetic bearing apparatus has at least three position sensors for the determination of the radial position of the body in a stator system which is stationary relative to the stator. Since two position sensors are sufficient in principle in order to determine the radial position of the body in the stator system, an error tolerance in the position sensor mechanism, which is essential for the regulation of the position of the body and thus for the operation of the bearing apparatus, can be achieved through the use of at least three position sensors. In the event of a failure of one position sensor the radial position of the body is namely still possible in a unique manner by means of the remaining position sensors. This means a further increase of the operating safety of the magnetic bearing apparatus.

A position unit is preferably provided which converts the signals of the position sensors by means of a transformation into a two-component position signal, the one component of which represents the X coordinate and the other component of which the Y coordinate of the body in the stator system.

In a preferred embodiment the three position sensors are arranged in such a manner that in each case two adjacent position sensors are mutually displaced with respect to the peripheral direction of the stator by an angle of 120° relative to one another. In this arrangement it is namely possible to compensate the failure of a position sensor in a particularly simple manner. If the defective position sensor produces the signal zero, no measure at all is required in principle for the compensation. The transformation into the two-component position signal can be carried out with an unchanged transformation matrix and nevertheless leads to a correct position regulation.

The position unit preferably monitors the functioning of the position sensors. This can for example be done in such a manner that the position unit checks for each position sensor whether the signal produced by it or the mean value of a plurality of its signals lie within a predeterminable tolerance range.

If the position unit in the above mentioned 120° arrangement of the position sensors detects the occurrence of a fault, then it sets the signal of the associated position sensor to zero prior to the transformation and then carries out the transformation with the same transformation matrix as in the case that all position sensors are operating correctly.

If the angle between adjacent position sensors does not amount to 120°, then in the event of a failure of a position sensor a modification of the transformation is in general required in order to ensure a correct position regulation.

In accordance with another likewise preferred embodiment the position unit monitors, by means of signals of at least one of the position sensors, the functioning of the other position sensors.

If for example three position sensors are provided, then it is possible for the determination of the two-component position signal, that is, in the transformation, to use only two of the three sensor signals in each case and to check by means of the third signal whether the other position sensors are operating correctly.

In the event that a fault arises in one position sensor, the position unit can then select a different transformation for the determination of the position signal in which only the signals from fault-free position sensors enter.

This measure of using one position sensor for the monitoring of the other position sensors is in principle possible for all desired angles between adjacent position sensors (with the exception of the angles of 0° and 180°). In regard to a simple evaluation of the sensor signals the three position sensors are however preferably arranged in such a manner that the angle between the first and the second position sensor and the angle between the second and the third position sensor amounts to 45° or 60° in each case when viewed in the peripheral direction of the stator.

A further advantageous measure consists in that each position sensor comprises two sensor elements which are mutually displacedly arranged by 180° relative to the peripheral direction of the stator. Through this, namely, systematic faults such as offsets or thermal drifts can be compensated through the respective taking of differences of the signals of the sensor elements belonging to the same position sensor.

In a preferred embodiment the magnetic bearing apparatus is designed as a bearing-free motor in which the stator is designed as a bearing and drive stator and the body is the rotor of the bearing-free motor. Through this, namely, a bearing-free motor is possible which is little prone to faults and thus has an increased operating safety. This is in particular of great advantage for sensitive uses of the bearing-free motor such as, for example, blood pumps.

It is particularly preferred in this to design the rotor in disc or in ring shape.

In the following the invention will be described in further detail with reference to exemplary embodiments and with reference to the drawings. In the drawings, parts which is are identical or have equivalent functions are provided with the same reference symbol.

DESCRIPTION OF THE PREFERRED EMBODIMENTS

A magnetic bearing apparatus made in accordance with the invention for the journalling of a body 3 (FIG. 1) comprises a stator 2 with at least one control winding 22 with which a magnetic control field can be produced by means of which the position of the body 3 to be journalled relative to the stator 2 can be regulated.

Figure 1:
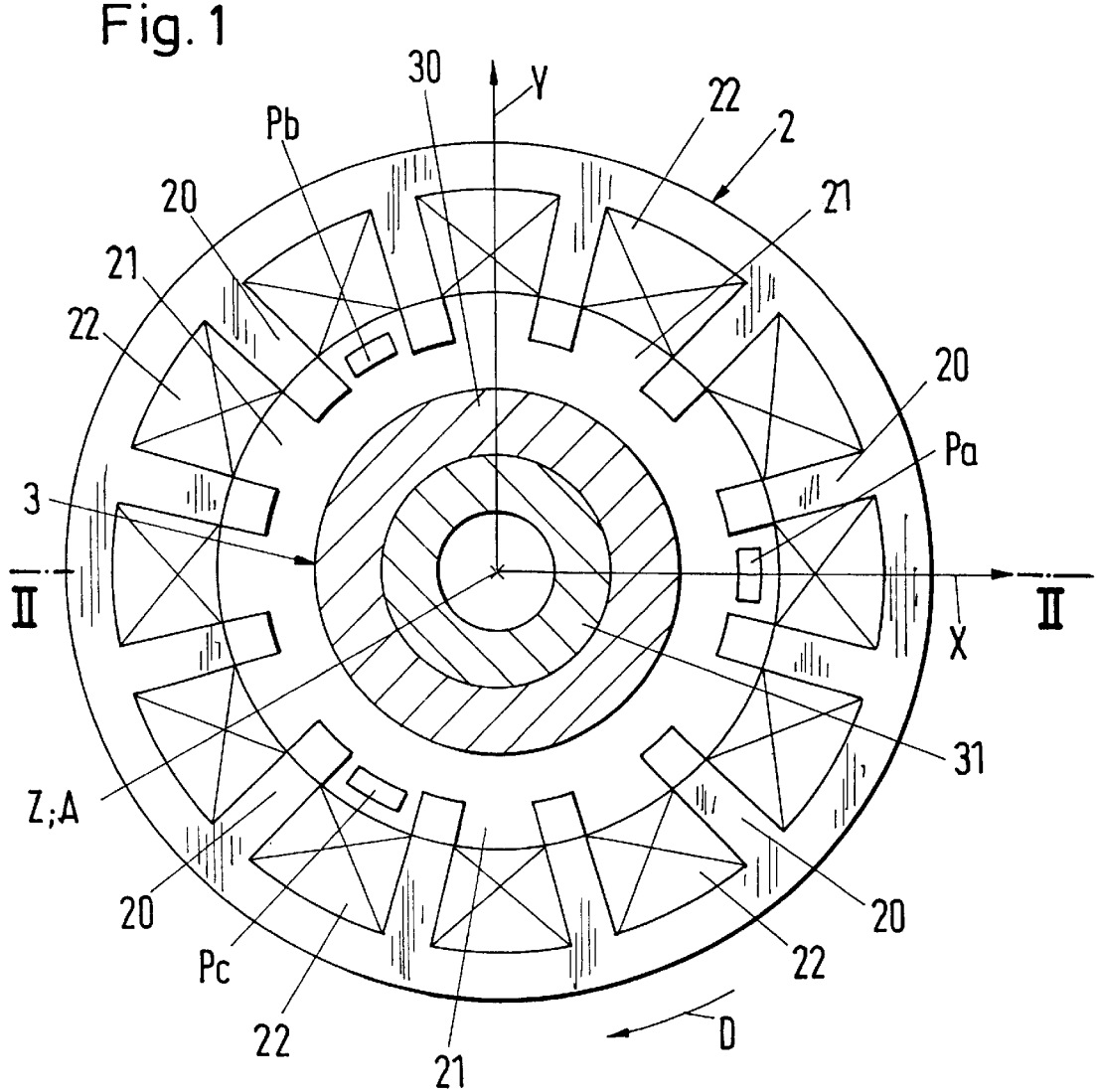
FIG. 1 is a cross-section through a stator of a first exemplary embodiment of the magnetic bearing apparatus made in accordance with the invention.

In a cross-sectional illustration FIG. 1 shows the stator 2 of a first exemplary embodiment of the magnetic bearing apparatus in accordance with the invention. For a better understanding FIG. 2 also shows a section through the stator 2 along the section line II—II in FIG. 1. In FIG. 3 the first exemplary embodiment of the magnetic bearing apparatus in accordance with the invention, which is designated in its entirety by the reference numeral 1, is illustrated in a symbolic block diagram, with the stator 2 not being illustrated in FIG. 3.

Figure 2:
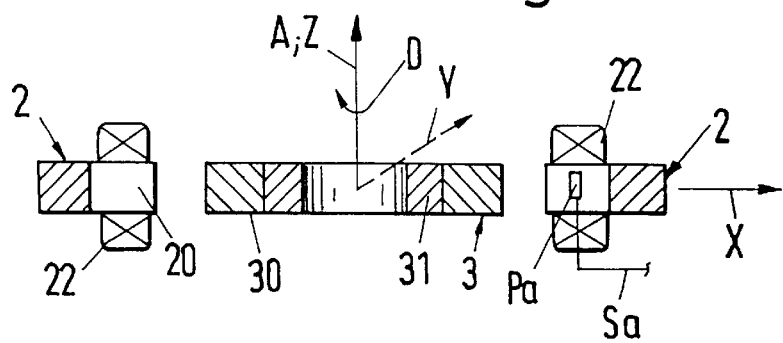
FIG. 2 is a section through the stator of FIG. 1 along section line II—II in FIG. 1.
Figure 3:
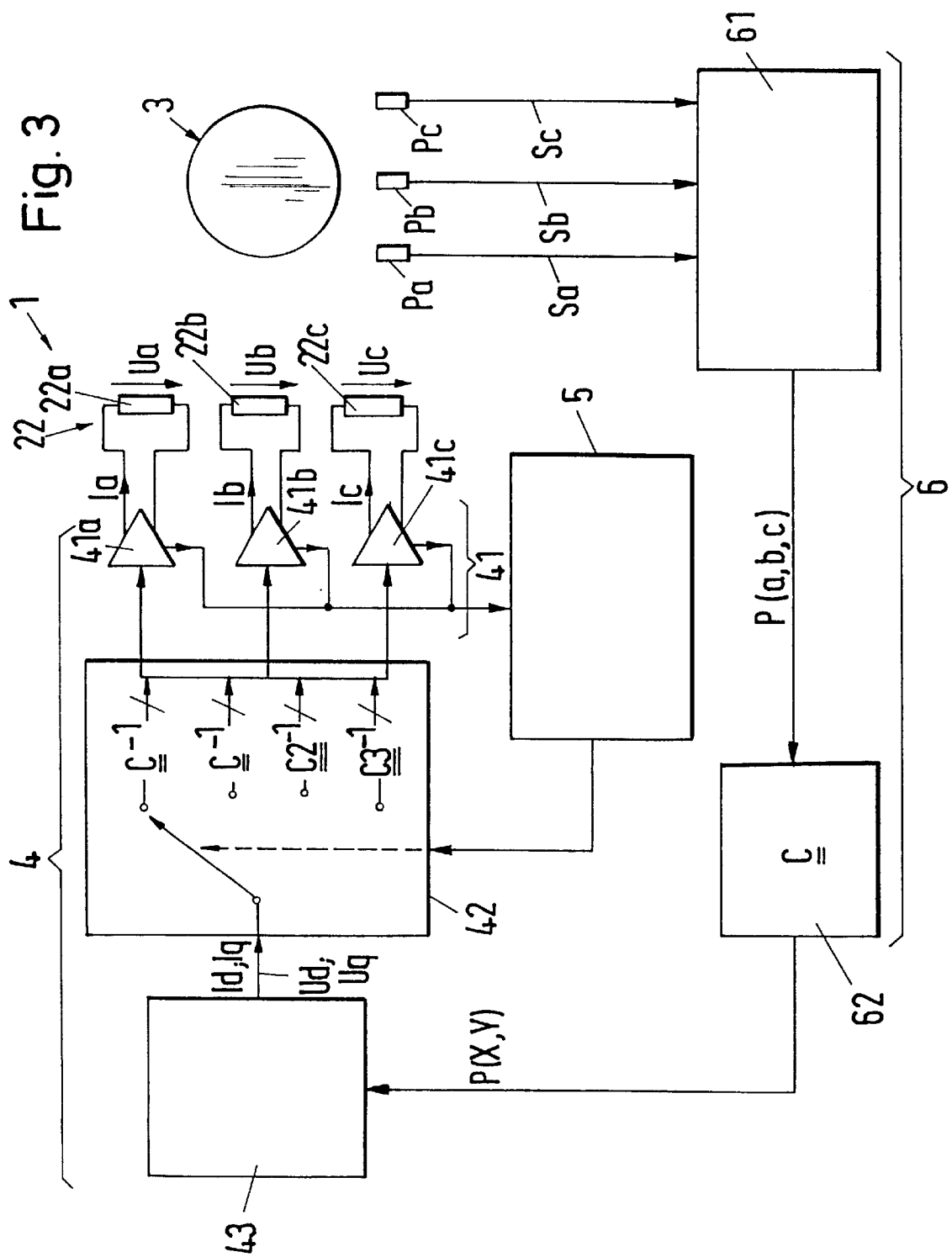
FIG. 3 is a block diagram of the first exemplary embodiment.

The stator 2 which is illustrated in FIGS. 1 and 2 is for example the bearing and drive stator of a bearing-free motor in the initially explained sense. The drive winding, which is likewise wound on the stator, and the number of pole pairs of which differs by one from the number of pole pairs of the control winding 22, is however not illustrated separately and is not treated in further detail in the following since it is not essential to the understanding of the invention. The stator 2 can however equally well be the stator of a magnetic bearing apparatus such as is disclosed in the previously cited WO-A-97/07340.

In the following reference is made with exemplary character to the case that the body 3 to be journalled is a rotor 3. This can for example be the bearing and drive stator of a bearing-free motor or a rotating shaft which is to be journalled. The desired axis of rotation, by which is meant that axis about which the rotor 3 rotates in the operating state when it is located at an exactly centered position (desired position) relative to the rotor 2, as is illustrated in FIGS. 1 and 2, will be simply designated as the axis of rotation A in the following. The direction of rotation is indicated by the arrow D.

It should however be emphasized that the invention is not restricted to those cases in which the body 3 to be journalled rotates. The invention is also suitable for the journalling of non-rotating, for example levitating, bodies 3. For the description of magnetic bearing apparatuses, in particular for their mathematical description, a stator system is usually used which is defined as follows. The stator system is a Cartesian coordinate system with the coordinate axes X, Y, Z (see FIGS. 1 and 2) which is stationary relative to the stator 2, and the origin of which lies at the center of the stator, that is, at the geometrical center of the space surrounded by the stator 2. By definition the Z axis points in the direction of the axis of rotation A of the rotor 3 or, respectively, in a non-rotating body it is perpendicular to the plane with respect to which the stator 2 journals the body 3. In the illustration in accordance with FIG. 1 the Z axis is perpendicular to the plane of the drawing. The direction of the Z axis will be designated in the following as the axial direction. The definition of the X and the Y axis of the stator system in the plane perpendicular to the Z axis which contains the origin is arbitrary. The X-Y plane which is spanned by the X and the Y axis is the plane in which the rotor 3 rotates during operation if it is not tilted or deflected in the axial direction. The position of the rotor 3 or in general of the body 3 to be journalled with respect to the X-Y plane is designated in the following as its radial position.

The stator 2 in accordance with FIGS. 1 and 2 is designed as a toothed stator 2 with a plurality of stator teeth 20 extending radially in the direction towards the rotor 3 with gaps 21 lying between them. The rotor 3 is designed as a ring-shaped permanent magnetic rotor 3 with a permanent magnetic ring 30 and an iron yoke 31 which is arranged to lie radially inwardly relative to the permanent magnetic ring 30. The rotor 3 can however for example also be designed in the shape of a disc.

Furthermore, three position sensors Pa, Pb and Pc are provided for the determination of the radial position of the rotor 3 and are connected via signal lines Sa, Sb, Sc (see also FIG. 3) to a position unit 6, which will be discussed below in further detail. The position sensors Pa, Pb, Pc are here in each case arranged in a gap 21 between two adjacent stator teeth 20. Alternatively, it is also possible to attach the position sensors Pa, Pb, Pc in each case to the radial inner end of a stator tooth 20.

The control winding 22 for the production of the magnetic control field, which is merely symbolically indicated in FIGS. 1 and 2, is. wound around the stator teeth 20. In particular the individual electrical lines of the control winding are not illustrated. The control winding has at least three loops 22a, 22b, 22c (FIG. 3), with each loop 22a, 22b, 22c belonging to a different electrical phase, which means that the control winding 22 is designed to be at least three phased. In the following reference is made to the case, which is particularly important in practice, that the control winding 22 is exactly three phased, that is, is designed with three loops 22a, 22b, 22c. The explanations however also hold analogously for the more general case of an n-phase control winding (with n>3).

The control winding 22 is wound around the individual stator teeth 20 in a manner which is known per se and thus forms a plurality of discrete coils for the production of the magnetic control field. In this a plurality of discrete coils can be electrically connected to one another in a parallel circuit or in a series circuit. The totality of all the discrete coils which are connected to one another in parallel or in series is designated as a loop 22a or 22b or 22c of the control winding 22. Naturally designs are also possible in which each loop comprises only one discrete coil.

In the stator 2 which is illustrated in FIG. 1 a discrete coil can for example be wound around each stator tooth 20. If the stator teeth are counted in the direction of rotation D starting at the X axis, then for example the discrete coils of the first, fourth, seventh and tenth stator tooth 20 can be connected together as a first loop 22a, the discrete coils of the second, fifth, eighth and eleventh stator tooth 20 as the second loop 22b, and the discrete coils of the third, sixth, ninth and twelfth stator tooth 20 as the third loop 22c. It is also for example possible to connect together in each case the discrete coils of the first to fourth stator tooth, of the fifth to eighth stator tooth and of the ninth to twelfth stator tooth to form a loop 22a, 22b and 22c respectively. These connections are however merely intended to serve in an exemplary manner for the explanation of the term loop. Depending on the special design of the rotor and depending on the special use, numerous other connections are also possible.

Each loop 22a, 22b, 22c of the control winding 22 with the part of a control device 4 supplying it forms a separate electrical phase. The control device 4 can supply each loop 22a, 22b, 22c with in each case a phase current Ia, Ib, Ic or a phase voltage Ua, Ub, Uc as a control parameter. The control device 4 can be designed as a current controller or a voltage controller for the control winding 22, which means that the position regulation of the rotor 3 can be designed as a current regulation or alternatively as a voltage regulation. Since in practice however current regulations are mainly used, reference is made in the following to a current regulation. For a voltage regulation however the same explanations hold in an analogous manner.

In the three-phase design of the control winding 22 the phase shift between the phase currents Ia, Ib, Ic—as is also usual for technical rotary current—amounts to in each case 120°.

The normal operating state of the first exemplary embodiment of the invention of the bearing apparatus 1, which is designated as the first operating mode, can be roughly described as follows (FIG. 3). By means of the control winding 22 the magnetic control field is generated, which is usually a magnetic rotary field in the case of a rotating rotor 3, and by means of which the radial position of the rotor 3 can be regulated in a manner which is known per se. By means of the position sensors Pa, Pb, Pc and the position unit 6 a two-component position signal P(X,Y) is generated in a manner which is yet to be explained, of which one component represents the X coordinate and the other component represents the Y coordinate of the rotor 3 in the stator system. By means of this position signal P(X,Y) the control device 4, which comprises a position regulator 43, a transformation unit 42 and an amplifier unit 41, determines the momentary deviation from the radial desired position of the rotor 3 and then regulates the three phase currents Ia, Ib, Ic in such a manner that the resultant magnetic control field moves the rotor 3 back into its radial desired position or, respectively, holds the rotor 3 in its radial desired position.

Figure 4:
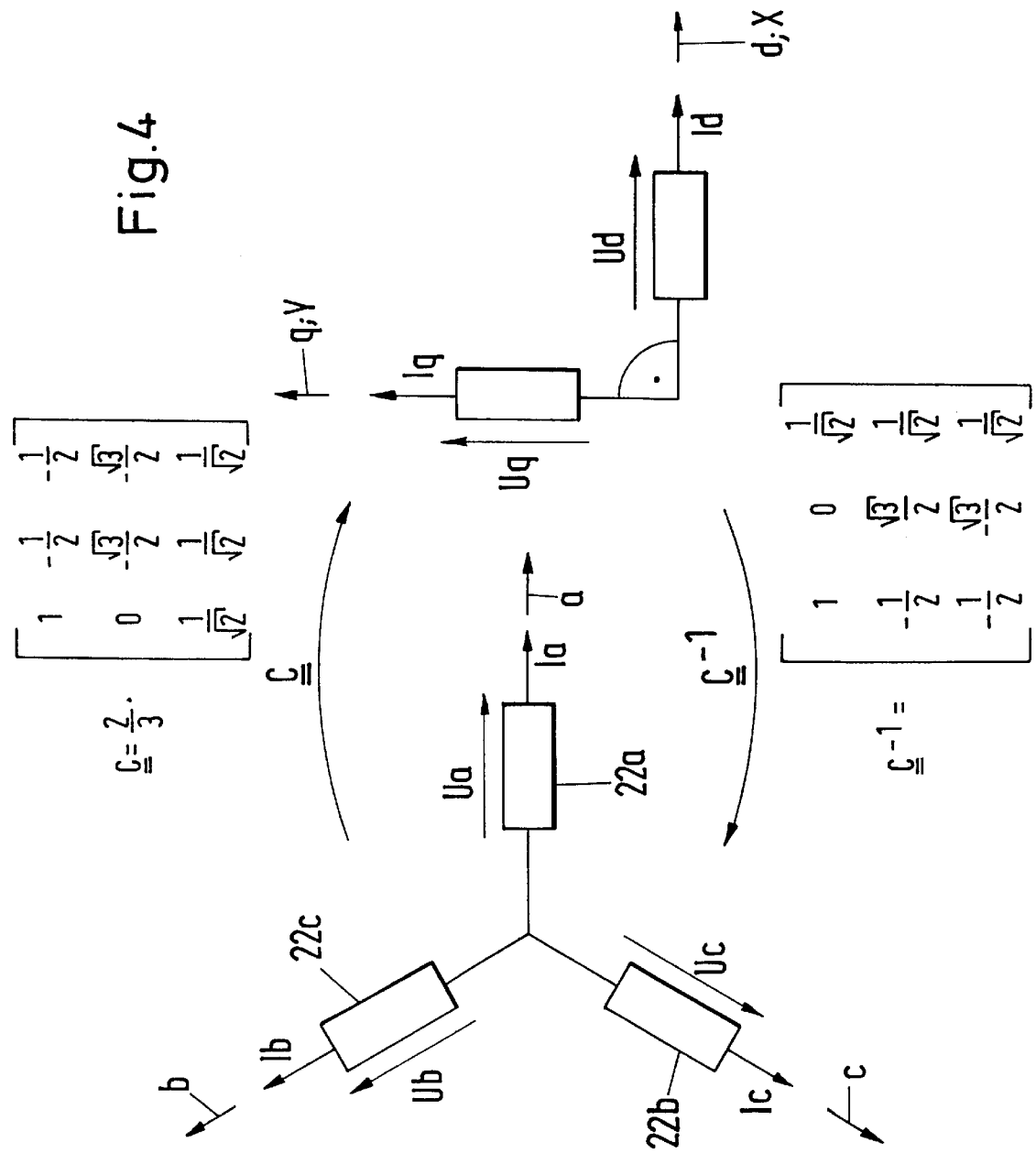
FIGS. 4–7 are representations for the illustration of transformations between different systems with the associated transformation matrices.

Before the invention is now explained, transformations which are required for the understanding will be explained with reference to FIGS. 4 to 7. It is known from the theory of electrical rotary machines that in a vector representation of the electrical machine a three-phase machine or in general an n-phase machine can be considered on the basis of a two-phase substitute machine. The mathematical transformation for the conversion from the three-phase system, or in general from the n-phase system, into the substitute system, which is a two-phase system, or, respectively, the inverse transformation, is known as the Park transformation. The great advantage of two-phase representations lies in that the machine parameters, such as in the present case e.g. the currents or the voltages, can be represented as planar vectors in a rectangular Cartesian coordinate system, the axes of which are usually designated by d and q. FIG. 4 illustrates this transformation for the magnetic bearing apparatus 1 with the three-phase control winding 22, which comprises the loops 22a, 22b and 22c. On account of the simpler understanding, it will be further assumed without a restriction of the generality that the geometrical arrangement of the control winding 22 is such that the d axis coincides with the X axis of the stator system.

Then the q axis coincides with the Y axis of the stator system. In FIG. 4 the axes of the three-phase system are designated by a, b, c and the phase currents and the phase voltages respectively by Ia, Ib, Ic and Ua, Ub, Uc respectively. The corresponding substitute control parameters in the two-phase system are designated by Id, Iq and Ud, Uq respectively. In FIG. 4 the two transformation matrices $\underline{\underline{C}}$ and $\underline{\underline{C}}^{-1}$ are specified which describe the transformation from the three-phase into the two-phase system. These transformations will be designated in the following for short as a 3-2 transformation and a 2-3 transformation respectively. The following relationship thus holds for the phase currents Ia, Ib, Ic:

$$\begin{bmatrix} Ia \\ Ib \\ Ic \end{bmatrix} = \underline{\underline{C}}^{-1} \cdot \begin{bmatrix} Id \\ Iq \\ 0 \end{bmatrix} \text{ and, respectively, } \begin{bmatrix} Id \\ Iq \\ 0 \end{bmatrix} = \underline{\underline{C}} \cdot \begin{bmatrix} Ia \\ Ib \\ Ic \end{bmatrix}$$

The last row of the matrix $\underline{\underline{C}}$ or, respectively, the zero in the vector for the phase currents Id, Iq in the two-phase system serves in this only for the invertability. Analogous relationships also hold for the phase voltages.

The regulation of the radial position of the rotor 3 normally takes place in the Cartesian stator system. The computation of the phase currents or the phase voltages respectively which are required for the regulation of the radial position also takes place first in a two-phase Cartesian coordinate system, namely the d-q system which is defined by the d and q axes, as is for example explained in WO-A-97/07340 with reference to FIG. 10. Through a 2-3 transformation (Park transformation) the three phase currents Ia, Ib, Ic are then calculated in the three-phase system (a, b, c system) and impressed into the control winding 22.

In known magnetic bearings (see e.g. WO-A-97/07340) it is assumed as an auxiliary condition in the Park transformation that the sum of the phase currents Ia+Ib+Ic and the sum of the phase voltages Ua+Ub+Uc is zero. As a result of this auxiliary condition a magnetic bearing in accordance with WO-A-97/07340 or a bearing-free motor in accordance with WO-A-95/18925 respectively can be operated with a commercially available three-phase rotary current controller. In this the three phases are operated in a star point circuit (see e.g. FIG. 5b of WO-A-97/07340). The above named auxiliary condition is then nothing other than the known star point condition that the sum of the phase currents must be zero at the star point. It is however possible to fulfill this auxiliary condition Ia+Ib+Ic=0 or Ua+Ub+Uc=0 respectively only because the general transformation from a two-phase system into a three-phase system is not uniquely determined. The associated system of equations contains namely only two equations in a transformation from d, q to a, b, c, but three unknowns.

The invention is now based on the idea that as a result of the transformation between the two-phase system and the three-phase system, which is non-unique in the general case (that is, without an auxiliary condition), a three-phase system or even a system with n phases (n>3) can be operated with only two phases without concessions on the correct functioning of the magnetic bearing apparatus being required, provided the auxiliary condition Ia+Ib+Ic=0 is dropped. In accordance with the invention a second operating mode is thus possible in the magnetic bearing apparatus in which a reduced number of phases in comparison with the first operating mode, which is at least two, produces the magnetic control field. With these two phases, namely, the same control field, mostly a rotary field can be produced as with three or more phases. A prerequisite for this is however that the individual phase currents Ia, Ib and Ic respectively can be freely regulated, which means that for each loop 22a, 22b or 22c the respective phase current Ia, Ib or Ic must be regulatable independently of the other phase currents. How this can be realized technically will be explained further below.

Since the magnetic control field can be produced with two phases a bearing apparatus in accordance with the invention, of which the stator 2 has an n-phase control winding 22 in the general case, can also still be operated reliably when n–2 phases of the control winding fail. Since it is sufficient for the understanding, only the case of a three-phase control winding 22 will still be described in the following.

Figure 5:
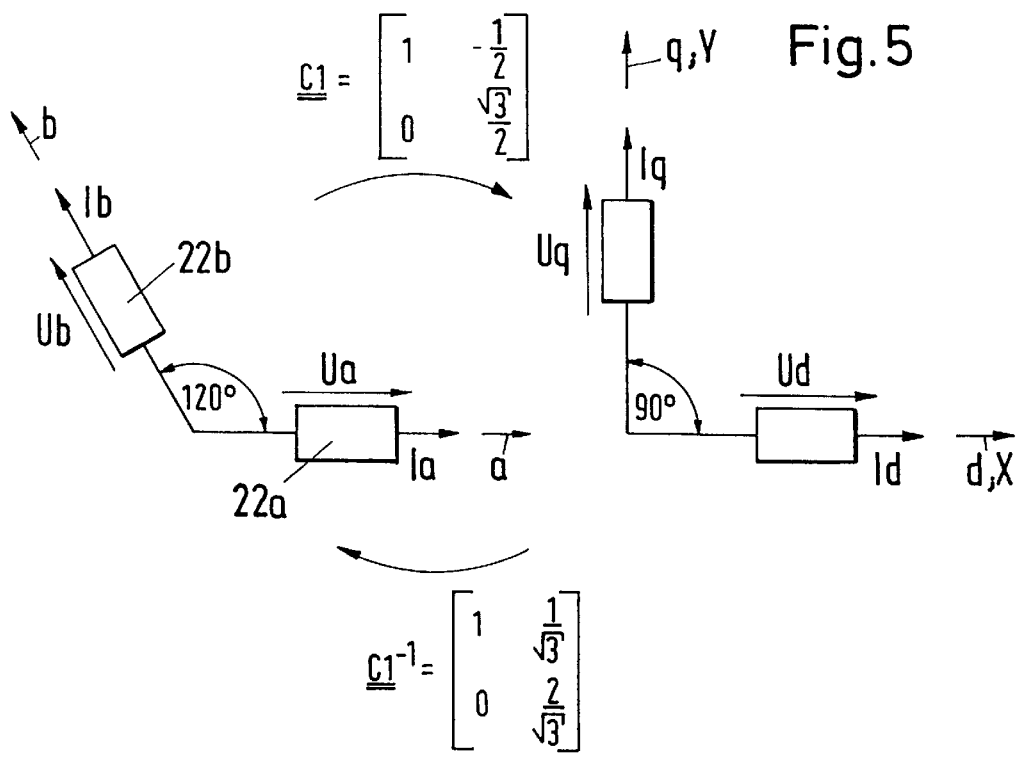
Figure 6:
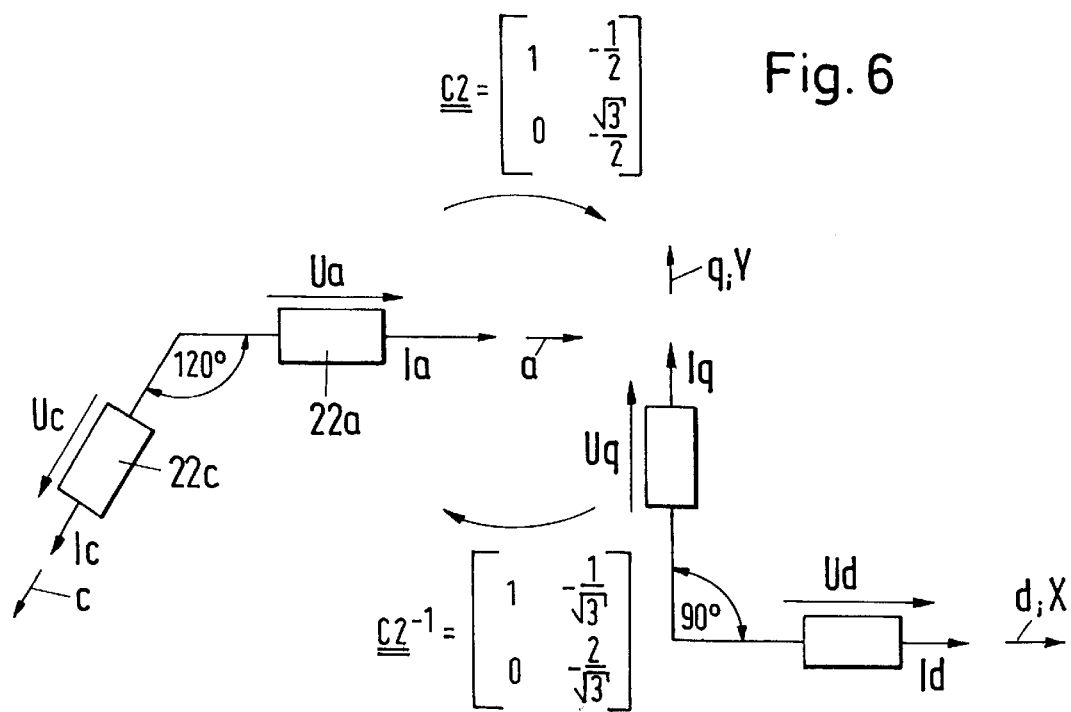
Figure 7:
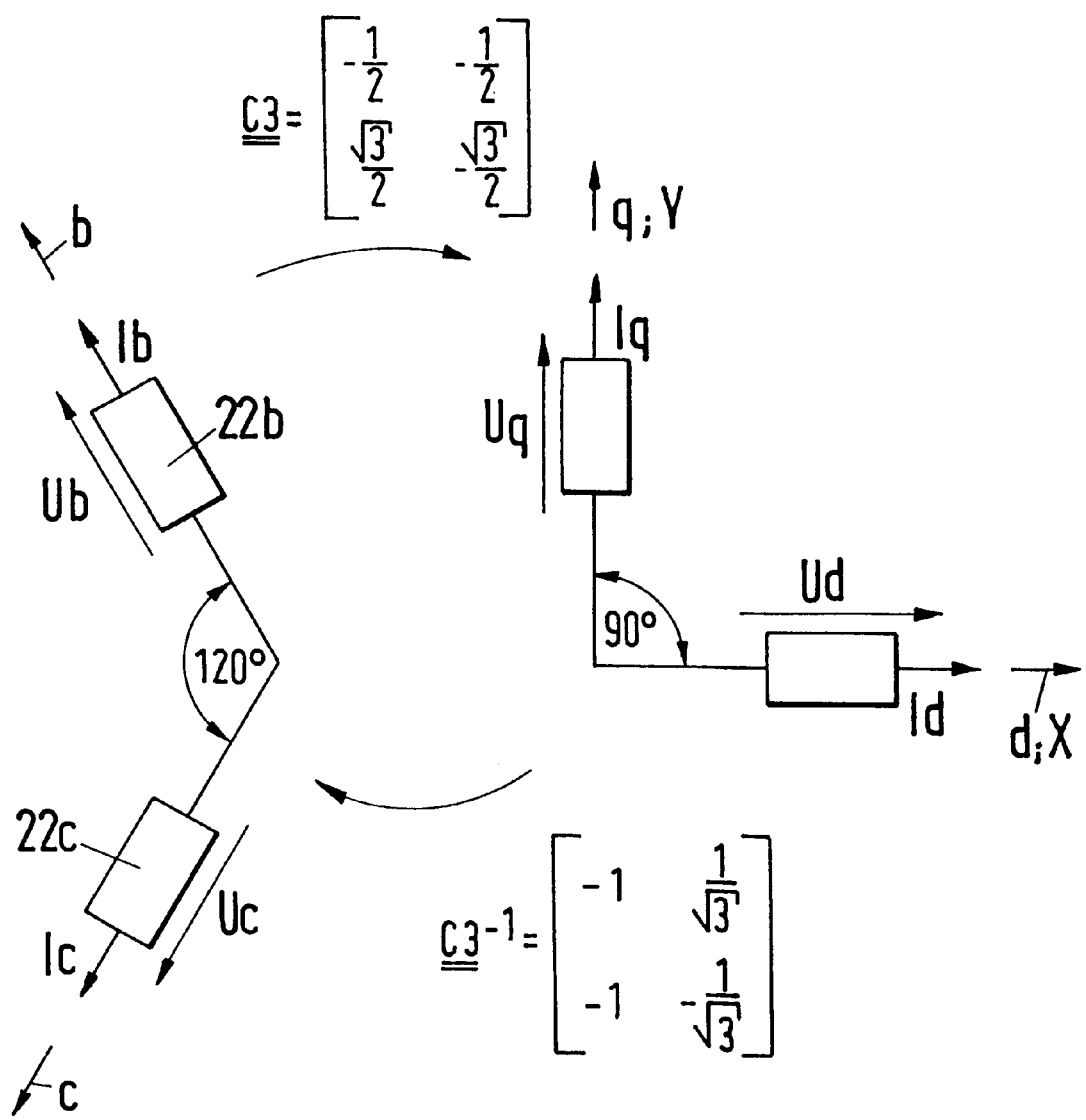

In FIGS. 5, 6 and 7 the three transformations between the a, b, c system and the d, q system are illustrated for the three possible cases that only two of the three phase currents Ia, Ib, Ic or phase voltages Ua, Ub, Uc respectively—that is, only two of the three loops 22a, 22b, 22c—are used for the production of the magnetic control field. FIG. 5 shows the case that only the phase currents Ia, Ib (loop 22a and loop 22b) are used for the production of the magnetic control field, FIG. 6 the case that only the phase currents Ia, Ic (loop 22a and loop 22c) are used and FIG. 7 the case that only the phase currents Ib, Ic (loop 22b and loop 22c) are used. The associated transformation matrices $\underline{\underline{C1}}$ and $C1^{-1}$ respectively (FIG. 5), $\underline{\underline{C2}}$ and $\underline{\underline{C2}}^{-1}$ respectively (FIG. 6) and $\underline{\underline{C3}}$ and $\underline{\underline{C3}}^{-1}$ respectively (FIG. 7) are in each case given for the respective transformation or inverse transformation.

Figure 8:
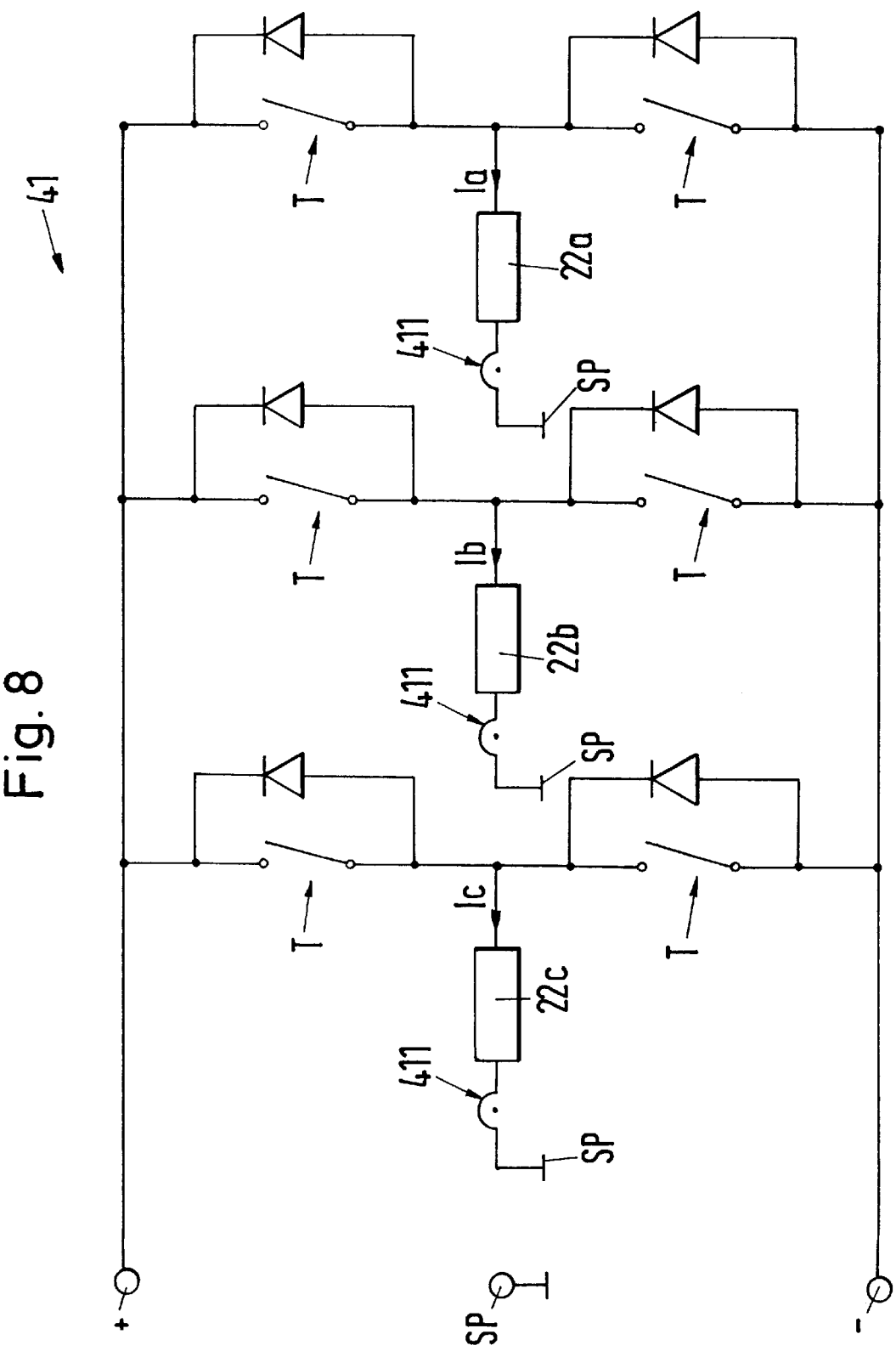
FIG. 8 is an electrical circuit diagram of an amplifier unit for the supply of the control winding of the stator.

In order to be able to regulate the three phase currents Ia, Ib, Ic independently of one another, the control device 4 comprises in a first preferred embodiment an amplifier unit 41, the electrical circuit of which is illustrated in FIG. 8. The amplifier unit 41 is a part of a three-phase rotary current controller, of which only the power section is illustrated in FIG. 8. For each loop 22a, 22b, 22c a bridge branch is provided which supplies the associated loop 22a, 22b, 22c with the respective phase current Ia, Ib, Ic in a manner which is known per se by means of switching transistors T and recovery diodes. The amplifier unit 41 is operated with two operating potentials, which are designated in FIG. 8 by + and –. These operating potentials + and – are d. c. potentials. If the control device 4 is designed as a d. c. voltage converter, then the voltage between the two operating potentials +, – is the intermediate circuit voltage of the d. c. voltage converter.

Each loop 22a, 22b, 22c is connected on the one hand to the bridge branch of the amplifier unit 41 which supplies it and on the other hand to a potential SP which is capable of being loaded and which is the same for all three loops 22a, 22b, 22c. This potential SP which is capable of being loaded lies between the two operating potentials +, – of the amplifier unit 41 and is the ground potential in the example shown in FIG. 8. The three loops 22a, 22b, 22c are thus connected in a star point circuit, with however the star point being capable of being loaded, that is, being connected to a potential SP which is capable of being loaded, so that aside from the three phase currents Ia, Ib, Ic an additional current can flow out via the star point or flow into the latter respectively. This means that the usual star point condition, that the sum of the phase currents Ia, Ib, Ic must always be zero at the star point, is no longer necessary in this circuit. This has the result that each phase current Ia, Ib, Ic can be regulated completely independently of the other phase currents. In each case a current measurement device 411 is provided in the individual phases for the determination of the individual phase currents Ia, Ib, Ic.

Figure 9:
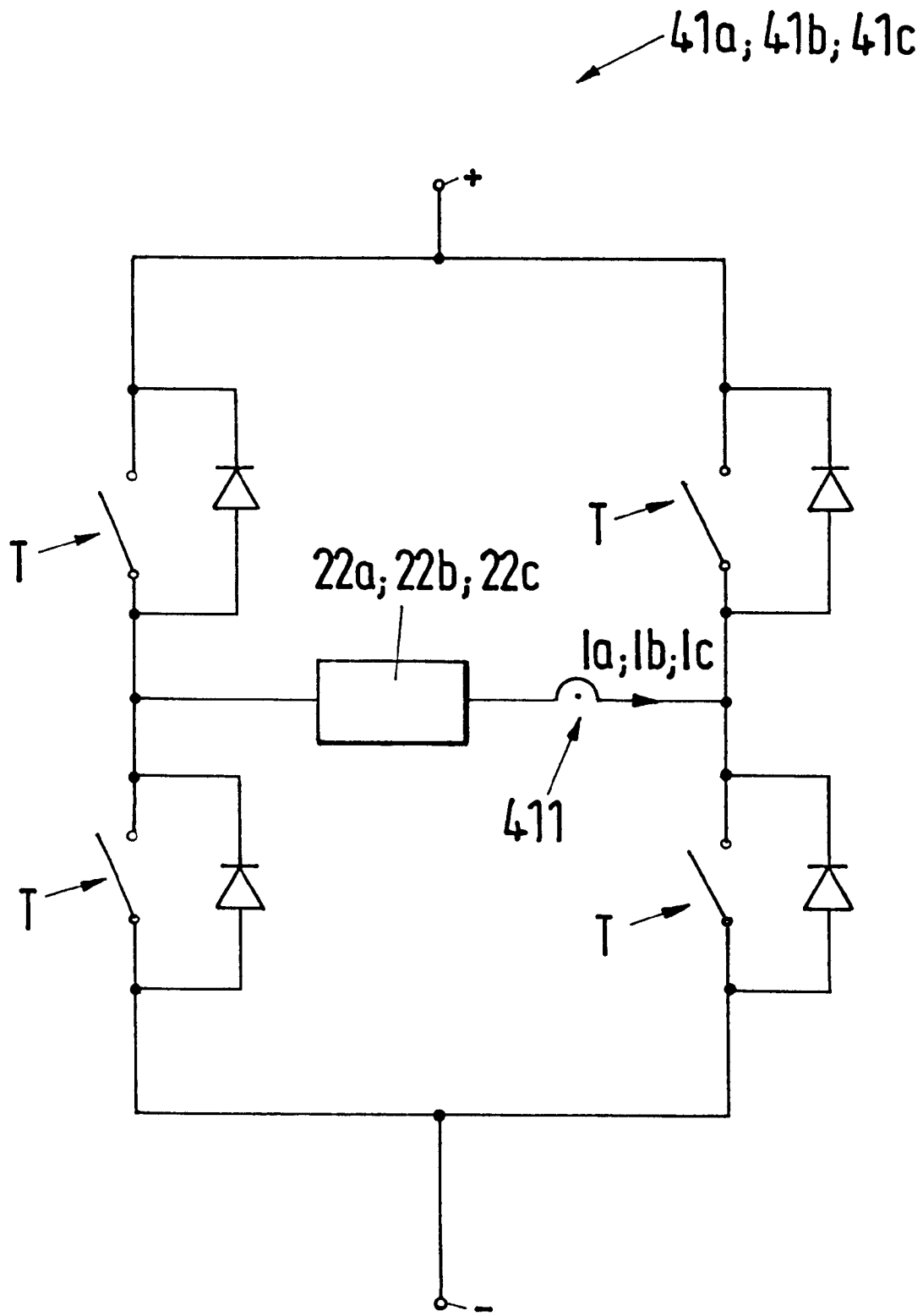
FIG. 9 is an electrical circuit diagram of a separate power amplifier for the supply of one phase of the control winding of the stator.

FIG. 9 clarifies a second likewise preferred embodiment of the amplifier unit 41 which enables an independent regulation of the individual phase currents Ia, Ib, Ic. In this embodiment a separate power amplifier 41a, 41b, 41c is provided in the amplifier unit 41 of the control device 4 for each phase or for each loop 22a, 22b, 22c respectively. FIG. 9 shows the electrical circuit diagram of a power amplifier 41a, 41b, 41c of this kind. The latter is designed as an H bridge circuit with the switching transistors T and recovery diodes and is operated with the two operating potentials + and –. For the measurement of the respective phase currents Ia, Ib, Ic a current measurement device 411 is again provided in each phase.

The signal processing and regulation apparatuses which are integrated into the amplifier unit 41, which is usually designed as an integrated circuit, are not shown in FIGS. 8 and 9.

Other embodiments of the amplifier unit 41 are naturally also possible. What is important, however, is that the amplifier unit 41 is designed in such a manner that it can be operated in all four quadrants and that it can supply each phase with in each case a phase current Ia, Ib, Ic which is independent of the other phase currents.

As already mentioned, the magnetic control field is generated with all three phases in the first operating mode, that is, with all three loops 22a, 22b, 22c. The position unit 6 (see FIG. 3) delivers the position signal P(X,Y) to the position regulator 43 of the control device 4. The latter establishes therefrom the desired value for the phase currents in the two-phase system, namely Id and Iq. These two values are sent to the transformation unit 42 which determines from them the desired values for the three phase currents Ia, Ib, Ic in the three-phase system a, b, c by means of a 2-3 transformation (see FIG. 4) and sends them to the amplifier unit 41. By means of the desired value for the three phase currents Ia, Ib, Ic the amplifier unit then regulates the radial position of the rotor 3. The details of this regulation will not be discussed in further detail here. They are for example described in the already cited publications WO-A-95/18925 and WO-A-97/07340.

The correct functioning of the individual phases, that is, in particular of the individual loops 22a, 22b, 22c and the amplifier unit 41 which supplies them, is monitored in this by a monitoring unit 5. If a fault arises in one of the phases the monitoring unit 5 switches the magnetic bearing apparatus 1 from the first operating mode into the second operating mode. For this the monitoring unit 5 sends a control signal to the transformation unit 42. In the latter then the 2-3 transformation by means of the matrix $\underline{\underline{C}}^{-1}$, which generates the desired value for the three-phase control parameters (phase currents Ia, Ib, Ic or phase voltages Ua, Ub, Uc in the three-phase a, b, c system) from the desired value for the two-phase control system (phase currents Id, Iq or phase voltages Ud, Uq in the two-phase d, q system) is replaced by one of the transformations $\underline{\underline{C1}}^{-1}$, $\underline{\underline{C2}}^{-1}$, $\underline{\underline{C3}}^{-1}$ (see FIGS. 5–7) which converts the desired value for the control parameters in the rectangular d-q system into the desired value in a likewise two-phase system (a-b or a-c or b-c), the axes of which form an angle of 120° to one another. This is then a 2-2 transformation. The 2-2 transformation selected is then naturally that into which the faulty phase no longer enters. If the monitoring unit 5 for example detects a fault in the winding 22b, then it sends a control signal to the transformation unit 42, as a result of which a switchover from the matrix $\underline{\underline{C}}^{-1}$ to the matrix $\underline{\underline{C2}}^{-1}$ takes place in the transformation unit. In the following then the magnetic control field for the regulation of the radial position of the rotor 3 is generated in only two phases with the two fault-free phases. In the named example thus the control field in the second operating mode is produced only by the loops 22a and 22c. Thus even in the event of a failure of one of the phases a reliable functioning of the magnetic bearing apparatus 1 is still ensured.

Apparatuses and methods by means of which faults in the power amplifiers 41a, 41b, 41c (FIG. 9) or in the individual bridge branches of the amplifier unit 41 (FIG. 8) can be detected are sufficiently known. Such faults can be for example: the short circuit of one or more switching transistors T or one or more of the recovery diodes; the interruption of one or more switching transistors T or one or more of the recovery diodes; faults in the excitation; too high a temperature, etc. The excitations for the switching transistors of the amplifier unit 41, which are mainly designed as integrated circuits, usually already contain apparatuses of this kind in their hardware for the detection of faults. These then send their signals to the monitoring unit 5. With apparatuses of this kind for the detection of faults, several faults in the loops 22a, 22b, 22c of the electric control winding 22 can also be detected, such as for example a short circuit. Other faults can be established from the phase currents Ia, Ib, Ic, which can be determined by means of the current measurement devices 411 (FIGS. 8 and 9) and/or from the phase voltages Ua, Ub, Uc: e.g. in the event of an interruption the associated phase current in one of the loops 22a, 22b, 22c is zero although the phase voltage is different from zero; or in the event of a grounding the sum of the phase currents is different from zero but the sum of the phase voltages is equal to zero. Also winding shorts, which means the undesirable contact between for example two windings, can be detected on the basis of the phase currents and voltages because they lead to an asymmetrical current distribution in the presence of a symmetrical voltage distribution. In switching amplifiers (see FIGS. 8 and 9), which are preferably used in the apparatus in accordance with the invention, the phase voltages can be won directly from the excitation signal (pulse width modulation (PWM) signal) or in general from the desired value for the phase voltage. The latter also holds in the use of analogue amplifiers.

Naturally further apparatuses can also be provided in order to monitor the correct functioning of the individual phases. These apparatuses are then connected to the monitoring unit 5.

Figure 10:
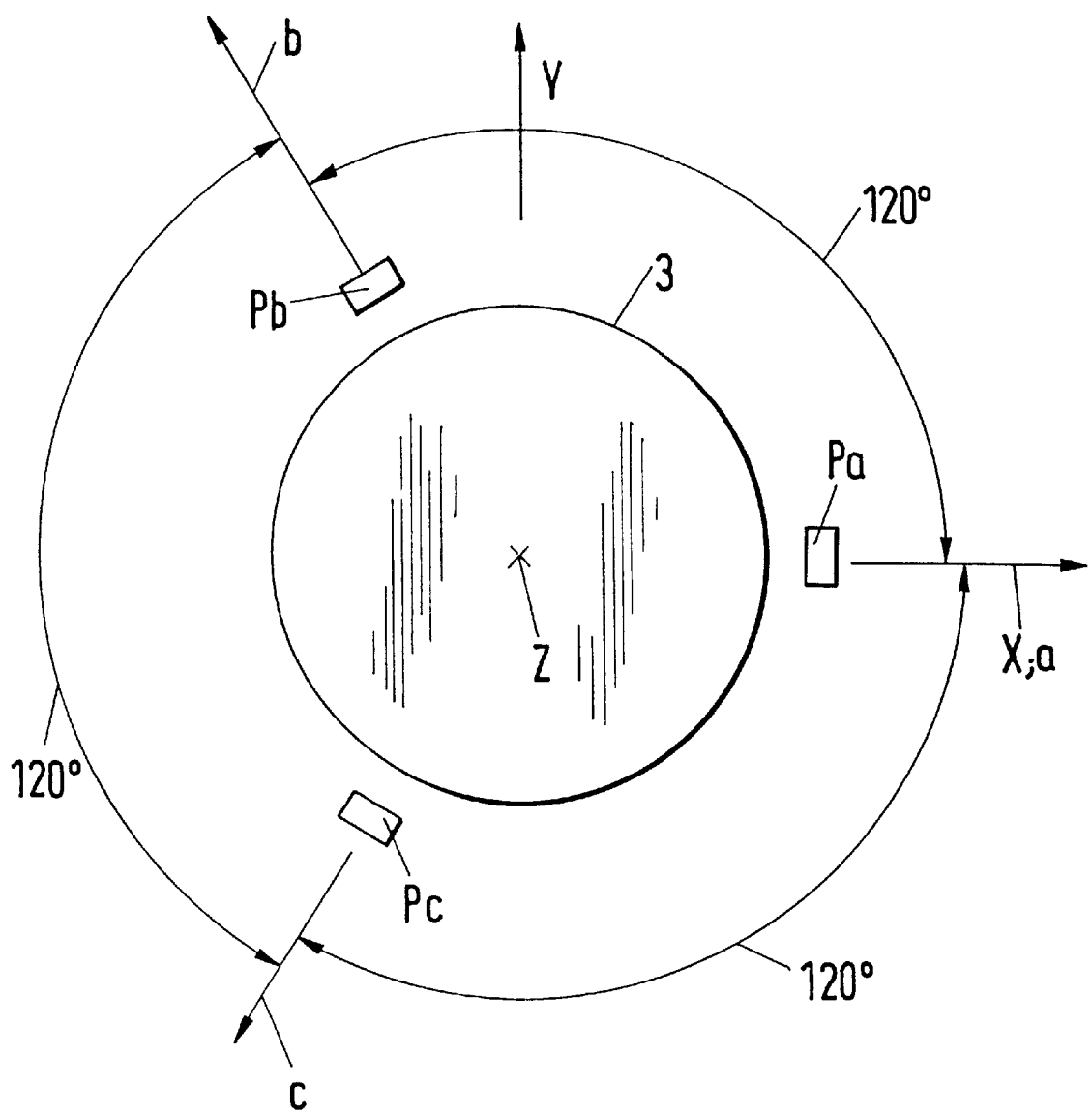
FIG. 10 is a schematic illustration of the arrangement of three position sensors.
Figure 11:
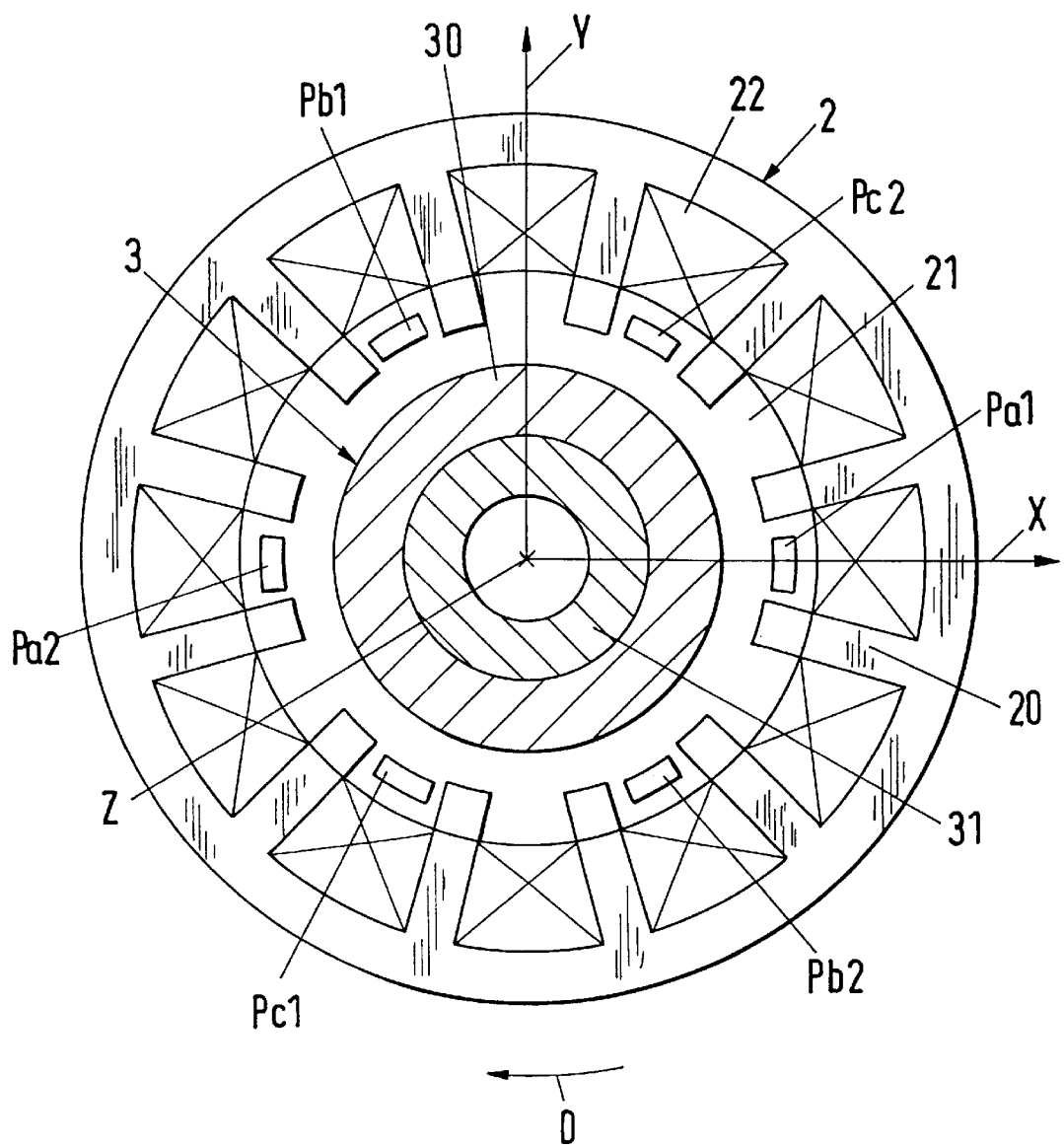
FIG. 11 is similar to FIG. 1, but for a variant of the first exemplary embodiment.

The position regulator 43 (see FIG. 3), which controls the radial position of the rotor 3 and provides the desired value for the control parameters (phase current or phase voltage) in the two-phase d-q system Id, Iq or Ud, Uq respectively, can, in particular in a three-phase design of the control winding 22, for example comprise two separate PID regulators, namely in each case one for the X and the Y component in the stator system, as is e.g. illustrated in FIG. 10 of WO-A-97/07340. Naturally more elaborate designs of the position regulator 43 are also possible, e.g. those which comprise state regulators. For position regulators or magnetic bearing regulators of this kind numerous designs are known from the literature. If the bearing apparatus in accordance with the invention is for example designed as a bearing-free motor, then the position regulator 43 can have a regulator structure in accordance with FIG. 23 of WO-A-95/18925. In this regulator structure the position regulator 43 additionally comprises rotational transformations and decoupling networks.

In the following it will now be described in more detail how the position sensor mechanism with the three position sensors Pa, Pb, Pc and the position unit 6 can preferably be designed in the magnetic bearing apparatus 1 in accordance with the invention. In principle a position sensor mechanism which is designed in this manner is however not restricted to the magnetic bearing apparatus 1 in accordance with the invention, but rather can also be used for other magnetic bearing apparatuses in an analogous manner.

With respect to the position sensor mechanism the basic idea is also to provide at least three position sensors Pa, Pb, Pc in order thus to produce a fault-tolerant apparatus for the determination of the radial position of the rotor, which means that in the event of a failure of one or more position sensors a reliable determination of the radial position of the rotor 3 is still possible with the help of the remaining at least two position sensors. In principle, namely, the signal of two position sensors is sufficient in order to determine the radial position of the rotor 3 with respect to the X-Y plane of the stator system.

As already mentioned and illustrated in FIG. 1, three position sensors Pa, Pb, Pc are provided in the first exemplary embodiment of the magnetic bearing apparatus 1 in accordance with the invention in order to establish the radial position of the rotor 3 with respect to the X-Y plane of the stator system. These position sensors Pa, Pb, Pc send their signals to the position unit 6 (FIG. 3), which determines from them the two-component position signal P(X,Y) and sends it to the position regulator 43. In FIG. 10 the arrangement of the three position sensors Pa, Pb, Pc is reproduced in a schematic illustration, with the illustration of the stator 2 having been dispensed with for reasons of clarity. The three position sensors Pa, Pb, Pc are arranged in the X-Y plane of the stator system in such a manner that in each case two adjacent position sensors are mutually displaced by 120° with respect to the peripheral direction of the stator 2. In the arrangement shown in FIG. 10 the three position sensors Pa, Pb, Pc lie on the a, the b, and the c axis respectively of the three-phase a, b, c system, the a axis of which coincides with the X axis of the stator system. Naturally it is also possible to arrange the position sensors Pa, Pb, Pc in a plane parallel to the X-Y plane. All sensors which are known per se for the determination of the radial position of the rotor 3 are suitable as position sensors Pa, Pb, Pc, in particular inductive sensors, eddy current sensors and magnetic field probes such as Hall sensors or magnetoresistive probes.

In the arrangement shown in FIG. 10 the signal of the position sensor Pa represents the component a of the rotor position in the three-phase a, b, c system; correspondingly the sensors Pb and Pc represent the components b and c respectively of the rotor position in the three-phase a, b, c system. Consequently an equation analogous to that named above for the phase currents Ia, Ib, Ic holds for the relationship between the position vector of the rotor 3 with the components a, b, c in the three-phase system and the position vector in the stator system with the components X and Y, namely:

$$\begin{bmatrix} a \\ b \\ c \end{bmatrix} = \underline{\underline{C}}^{-1} \cdot \begin{bmatrix} X \\ Y \\ 0 \end{bmatrix} \text{ and, respectively, } \begin{bmatrix} X \\ Y \\ 0 \end{bmatrix} = \underline{\underline{C}} \cdot \begin{bmatrix} a \\ b \\ c \end{bmatrix}$$

with the same transformations $\underline{\underline{C}}$ and $\underline{\underline{C}}^{-1}$ respectively which are given in FIG. 4. The zero in the vector with the components X and Y has again been inserted in order that the relationship is invertable. It can here however also serve for the equalizing of an offset, as will still be explained further below.

During operation the position sensors Pa, Pb, Pc send their signals via the signal lines Sa, Sb, Sc to the position unit 6 (FIG. 3), which first determines from them in a first block 61 a three component position signal P(a,b,c) with the components a, b, c, which represents the position of the rotor 3 in the three-phase system with the axes a, b, c. The signal P(a,b,c) is sent to a second block 62 of the position unit, where it is converted by means of a 3-2 transformation with the matrix $\underline{\underline{C}}$ into the two-component position signal P(X,Y), which is then sent to the position regulator 43.

If a value for the third component of the above named vector $[X,Y,O]^T$ which is different from zero results in this 2-3 transformation, then this indicates an offset in the position sensors Pa, Pb, Pc. Consequently, the third component of this vector, which is normally zero, can be used in order to equalize a possibly present offset.

If now one of the position sensors Pa, Pb, Pc yields the signal zero as a result of a fault, then the radial position of the rotor 3 can still be uniquely determined from the signals of the other two fault-free position sensors. In principle it would be expected that one then uses the corresponding one of the three matrices $\underline{\underline{C1}}$, $\underline{\underline{C2}}$, $\underline{\underline{C3}}$ given in FIGS. 5 to 7 for the transformation instead of the matrix $\underline{\underline{C}}$ in the second block 62 of the position unit 6 in the event of the failure of one of the position sensors Pa or Pb or Pc. This is however not necessary for the following reasons. Through a comparison of the matrices given in FIGS. 5 to 7 with the matrix given in FIG. 4 it can be recognized that each of the matrices $\underline{\underline{Ci}}$ with i=1, 2, 3 is a submatrix of the matrix $\underline{\underline{C}}$. If for example the position sensor Pa is faulty and continuously yields a zero signal, then the matrix $\underline{\underline{C3}}$ would have to be used for the transformation. The latter results from the matrix $\underline{\underline{C}}$ by crossing out the first column and the last row and replacing the factor in front of the matrix $\underline{\underline{C}}$ by 1. If now in spite of the error in the position sensor Pa the matrix $\underline{\underline{C}}$ is used and the latter is applied to the position vector in the three-phase system with the components a=0 (faulty), b and c, then the position in the X-Y plane of the stator system which is calculated by means of the matrix $\underline{\underline{C}}$ is admittedly not correct; that is, the X and the Y components of the position signal P(X,Y) do not correspond to the actual momentary position of the rotor, but the direction of the detected deflection, which is determined by the ratio of the X component to the Y component, still corresponds to the direction of the actual deflection. Analogous remarks hold for a fault in the position sensor Pb or Pc.

Thus if one of the position sensors Pa, Pb, Pc fails and delivers a zero signal, then the 3-2 transformation is nevertheless carried out in the second block 62 of the position unit 6 by means of the matrix $\underline{\underline{C}}$, with one of the input parameters a, b, c being zero. This leads to the position signal P(X,Y) still giving the correct direction of the deflection of the rotor 3 but the magnitude of the deflection of the rotor no longer being correct. For the closed control loop of the magnetic bearing apparatus 1 this however means only a change of the loop amplification by a factor of 2/3. A robustly designed control device 4 can however deal with this change in the amplification and correctly regulate the radial position of the rotor.

In the arrangement of the position sensors Pa, Pb, Pc described here in which the respective adjacent position sensors are arranged with a mutual displacement of 120° in the X-Y plane of the stator system, a large number of possible faults in one of the position sensors Pa, Pb or Pc are thus tolerated without additional measures being required for this. This means that the regulation of the radial position of the rotor 3 also still works reliably without further measures when one of the position sensors is faulty. This holds for all the possible faults in a position sensor Pa, Pb, Pc which have as a result that the corresponding position sensor Pa or Pb or Pc yields a zero signal. Especially in induction sensors, eddy current sensors or magnetic sensors the most frequent cause of a fault is an interruption or a short circuit of the sensor cable or in the sensor itself. The latter holds in particular in induction and eddy current sensors, which have windings. These sources of faults lead to the signal of the associated position sensor being zero in a corresponding design of the operating circuit so that a fault of this kind is tolerated without further measures and the functioning of the position regulation is still ensured. This 120° arrangement of the position sensors Pa, Pb and Pc thus enables in a very simple manner a position sensor mechanism which still functions unobjectionably even in the event of a failure of one of the position sensors Pa, Pb, Pc.

A further leading variant with respect to the position sensor mechanism consists in the first block 61 (FIG. 3) of the position unit 6 detecting the failure of one of the position sensors Pa, Pb or Pc. This is for example possible in that it is monitored whether the sensor signals are plausible. For this an electronic circuit can be provided, the first block 61 of which checks whether the signal of each position sensor Pa, Pb, Pc when averaged over time lies within a predeterminable tolerance range. In this the time interval over which the averaging is in each case carried out comprises a plurality of sampling periods of the position sensors Pa, Pb, Pc. If the first block 61 detects a fault in one of the position sensors Pa, Pb, Pc, then the associated sensor signal is set to zero by the hardware or the software, and the loop amplification is adapted accordingly. If the first block 61 for example has detected a fault in the position sensor Pb, then it sets the component b of the three-component position signal P(a,b,c) to zero before sending it to the second block 62 for transformation and adapts the loop amplification.

A further advantageous variant of the position sensor mechanism is illustrated in FIG. 1 1, which shows a cross-section through the stator 2 in an illustration which corresponds to FIG. 1. In this variant each position sensor Pa; Pb; Pc comprises in each case two sensor elements Pa1, Pa2; Pb1, Pb2; Pc1, Pc2 which are displacedly arranged by 180° with respect to one another with respect to the peripheral direction of the stator 2, that is, oppositely disposed with respect to the Z axis of the stator system. Through an arrangement of this kind systematic errors such as common mode disturbances, offsets and thermal drifts in the position sensors Pa, Pb, Pc can be eliminated in that the difference signal of the two signals which come from those sensor elements which belong to the same position sensor is used for the evaluation.

It is naturally also possible to arrange the three position sensors Pa, Pb, Pc at an angle different from 120°. This however has as a result that the 2-3 transformation in the second block 62 of the position unit 6 must be modified in the event of the failure of a position sensor Pa, Pb, Pc. Since the respective substitute transformation which is to be used for all possible failures can also be determined from the geometrical arrangement of the position sensors in the concrete application, these substitute transformations can be stored in the position unit 6. If the failure of a position sensor Pa, Pb, Pc is detected, then the position unit 6 switches over to the associated transformation in a manner which is analogous to that which was explained further above with reference to the transformation unit 42 and the monitoring unit 5 respectively.

A second preferred exemplary embodiment of the magnetic bearing apparatus 1 in accordance with the invention differs from the first exemplary embodiment through the design of the position sensor mechanism. Otherwise the explanations of the first exemplary embodiment also hold in an analogous manner for the second exemplary embodiment.

Figure 12:
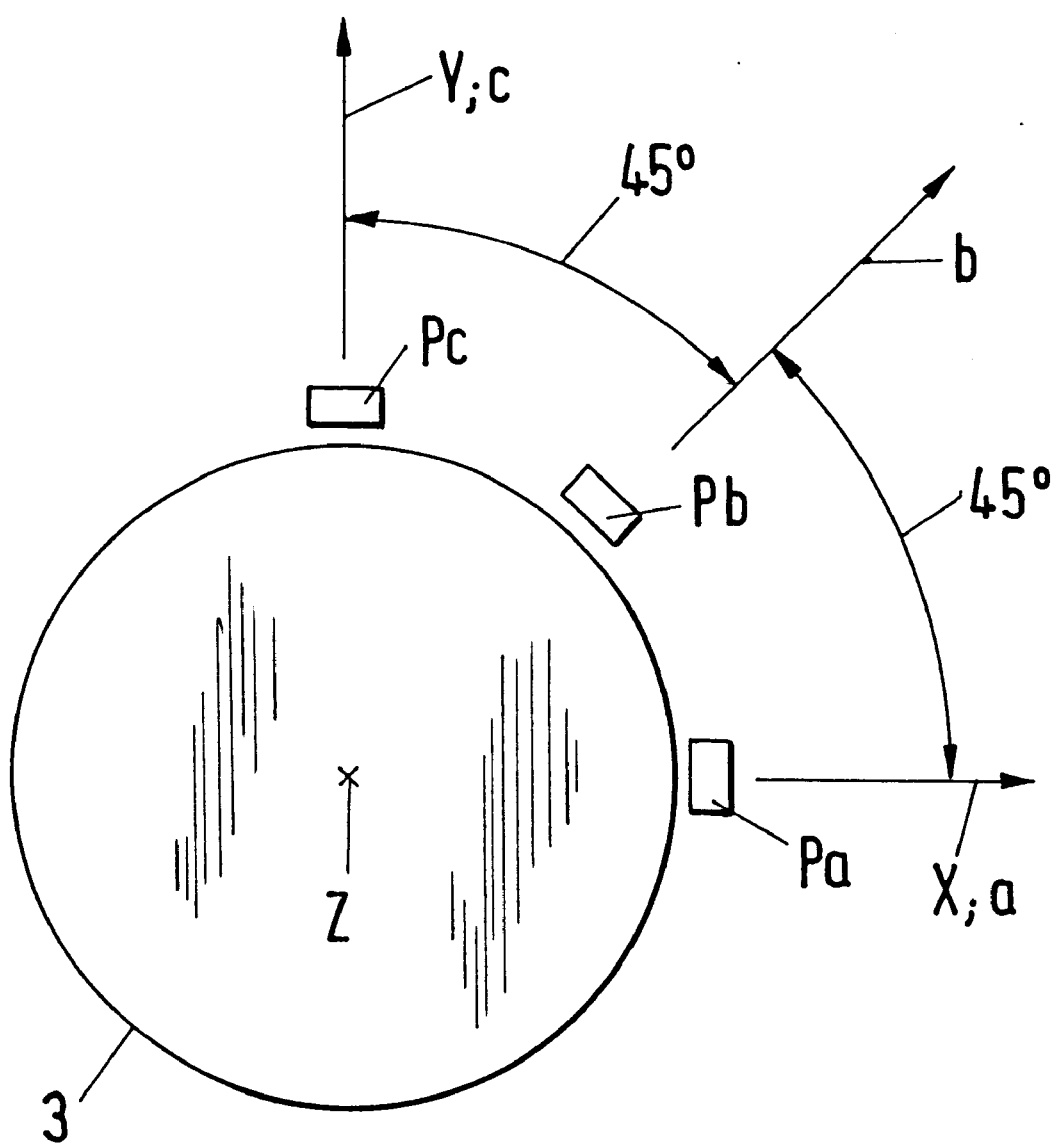
FIG. 12 is a schematic illustration of the arrangement of three position sensors in a second exemplary embodiment of the magnetic bearing apparatus.

In the second exemplary embodiment three position sensors Pa, Pb, Pc are likewise provided, the arrangement of which is illustrated in FIG. 12. Here as well, the stator 2 is not illustrated, as in FIG. 10. The three position sensors Pa, Pb, Pc are arranged in such a manner that, when viewed in the peripheral direction of the stator 2, the angle between the first and the second position sensor Pa and Pb as well as the angle between the second and the third position sensor Pb and Pc amounts to 45° in each case. If now a planar coordinate system with an a, a b, and a c axis, which all three lie in the X-Y plane of the stator system, with the a and b and c axis respectively being defined through the connection line between the origin of the stator system and the location of the position sensor Pa and Pb and Pc respectively, is introduced in analogy with the discussion with respect to the first exemplary embodiment, then the three position coordinates a, b, c of the rotor 3 can be determined in the a, b, c system by means of the three position sensors Pa, Pb, Pc. In the arrangement shown in FIG. 12 the a axis coincides with the X axis of the stator system and the c axis with the Y axis of the stator system.

Figure 13:
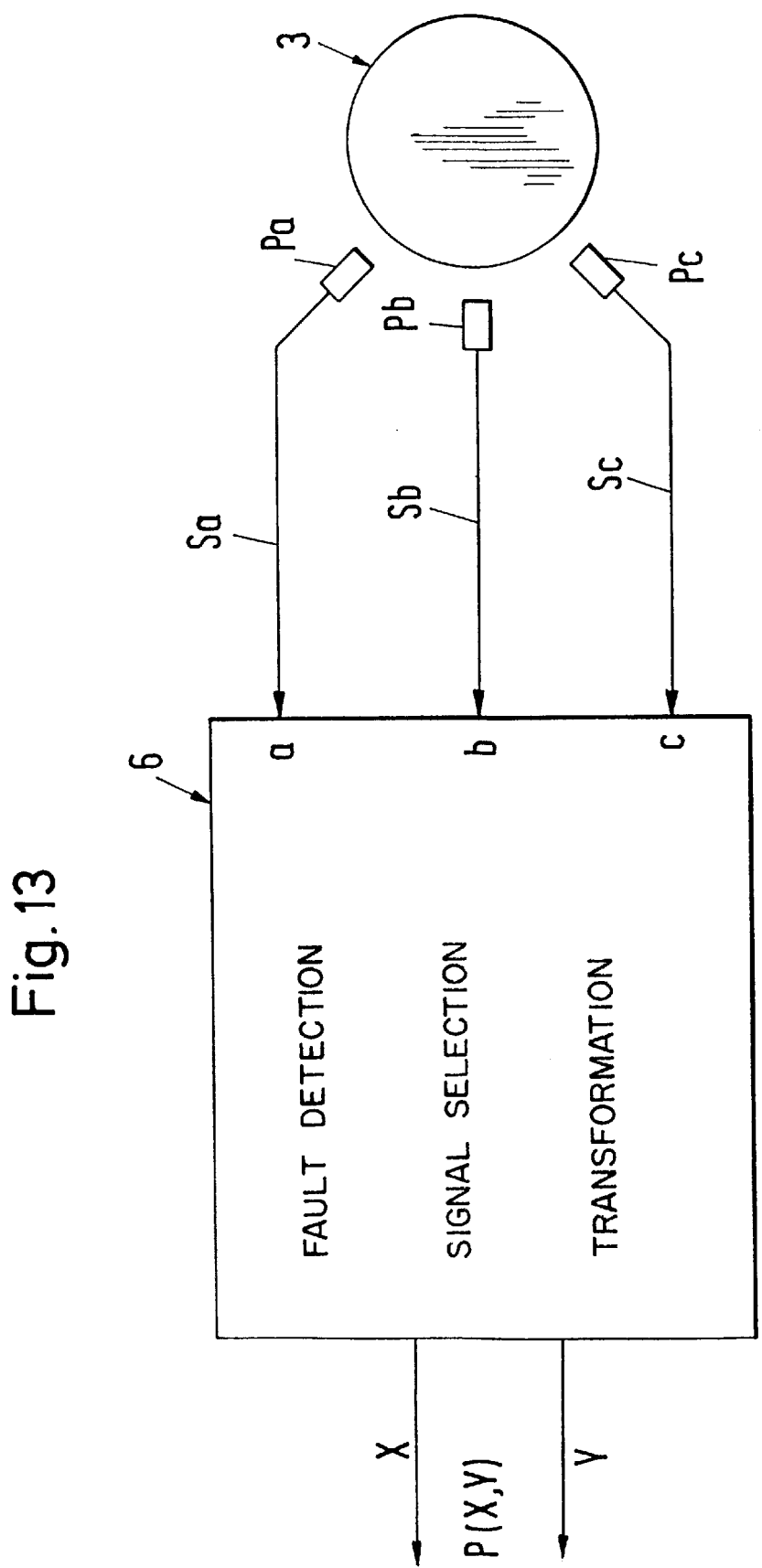
FIG. 13 is a schematic illustration of the position unit of the second exemplary embodiment.

The position sensors Pa, Pb, Pc are again connected by means of the signal lines Sa, Sb, Sc to the position unit 6, which is shown in FIG. 13. With the help of the sensor signals the position unit 6 generates the two-component position signal P(X,Y), which is supplied to the position regulator 43. In the event that all three position sensors Pa, Pb, Pc are functioning correctly, only the signals of the sensors Pa and Pc are used for the determination of the two-component position signal P(X,Y). Since the position coordinates a and c respectively in the three-phase a, b, c system are identical to the deflections of the rotor 3 in the direction of the X and of the Y axis respectively of the stator system, no transformation is required in the position unit 6. The third signal, namely that of position sensor Pb, uses the position unit 6 for monitoring the correct functioning of the other two sensors Pa and Pc. For the relationship between the position coordinates a, b, c in the three-phase a, b, c system, it holds, namely, that:

$$b = \frac{\sqrt{2}}{2} \cdot (a + c)$$

The position unit 6 thus continuously monitors whether this relationship is fulfilled. If this relationship is no longer fulfilled, a fault is present. This can also be a constant fault, such as for example an offset.

As already explained in connection with the first exemplary embodiment, the position unit 6 preferably monitors each individual position sensor Pa, Pb, Pc, for example in that the position unit 6 checks whether the time averaged sensor signal for each position sensor Pa, Pb, Pc lies within a predeterminable tolerance range. In this the averaging is done over a time interval which corresponds to a plurality of sampling periods of the position sensors Pa, Pb, Pc. As soon as the position unit 6 detects a fault in one of the position sensors Pa, Pb, Pc, it applies a corresponding transformation in order to determine the two-component position signal P(X,Y) from the signals of the two remaining fault-free position sensors Pa, Pb, Pc. For the arrangement illustrated in FIG. 12 the possible transformations are determined through the following equations:

If the position sensor Pc fails:

$$\begin{bmatrix} X \\ Y \end{bmatrix} = \underline{T1} \cdot \begin{bmatrix} a \\ b \end{bmatrix} \quad \text{with} \quad \underline{T1} = \begin{bmatrix} 1 & 0 \\ -1 & \sqrt{2} \end{bmatrix}$$

If the position sensor Pb fails:

$$\begin{bmatrix} X \\ Y \end{bmatrix} = \underline{T2} \cdot \begin{bmatrix} a \\ c \end{bmatrix} \quad \text{with} \quad \underline{T2} = \begin{bmatrix} 1 & 0 \\ 0 & 1 \end{bmatrix}$$

If the position sensor Pa fails:

$$\begin{bmatrix} X \\ Y \end{bmatrix} = \underline{T3} \cdot \begin{bmatrix} b \\ c \end{bmatrix} \quad \text{with} \quad \underline{T3} = \begin{bmatrix} \sqrt{2} & -1 \\ 0 & 1 \end{bmatrix}$$

In the case that the two-component position signal P(X, Y), which represents the X component X and the Y component Y of the rotor 3 in the stator system, is determined by means of the position coordinates a and c, no transformation is thus required; or expressed differently, the transformation is the identity transformation with the unit matrix $\underline{T2}$.

In the operating state the position unit 6 operates as follows (FIG. 13). The position unit 6 receives the corresponding sensor signals from the position sensors Pa, Pb, Pc which represent the position coordinates a, b, c of the rotor in the three-phase system. On the basis of these position coordinates a, b, c the position unit 6 carries out a fault detection, a signal evaluation and the suitable transformation for the determination of the coordinates X and Y of the rotor position in the stator system. In the fault detection the position unit checks in the already explained manner whether a fault is present in one of the position sensors Pa, Pb or Pc. Depending on the result of the fault detection the position unit 6 then selects from the position coordinates a, b, c two fault-free ones and transforms the latter with the associated transformation into the two-component position signal P(X,Y) with the components X and Y, which represent the radial position of the rotor 3 in the stator system.

Naturally in the second exemplary embodiment the position sensors can again also comprise in each case two mutually oppositely disposed sensor elements.

Naturally arrangements of the position sensors Pa, Pb, Pc are also possible in the second exemplary embodiment in which the angle between the adjacent position sensors Pa and Pb or Pb and Pc respectively is not 45°, but rather has another arbitrary value. A likewise preferred value for this angle is 60°. The angle between the position sensors Pa and Pb on the one hand and the angle between the position sensors Pb and Pc on the other hand can also have values which are different from one another. The required transformations can be determined depending on the respective arrangement of the position sensors.

Through the invention thus a magnetic bearing apparatus is provided which still enables a correct operation, which means in particular a reliable magnetic journalling of the body to be journalled, even when faults arise. Through this the bearing apparatus has an increased operating safety. This is a great advantage in particular for sensitive applications in which a reliable and fault-free functioning of the magnetic bearing is essential. Therefore the magnetic bearing apparatus in accordance with the invention, equipped as a bearing-free motor with an integral rotor which has pump vanes for the forwarding of a liquid, is suitable in particular for blood pumps which are operated inside or outside the body.

What is claimed is:

1. Magnetic bearing apparatus for journalling a body comprising a stator with a control winding consisting of three loops for producing a magnetic control field for regulating a position of the body relative to the stator, each loop belonging to a different electrical phase, a control device which in a first operating mode supplies each loop with a phase current or a phase voltage as a control parameter, a control unit for regulating the control parameter for each loop independently of the control parameters for the other loops, and a monitoring unit for switching the bearing apparatus into a second operating mode in which a reduced number of only two phases produces the magnetic control field.

2. Magnetic bearing apparatus in accordance with claim 1 wherein the monitoring unit monitors the functioning of each individual phase and, when a fault arises in a phase, switches the bearing apparatus into the second operating mode, in which only phases without a fault produce the magnetic control field.

3. Magnetic bearing apparatus in accordance with claim 1 wherein the control device comprises an amplifier unit and wherein the control unit comprises a star point which is capable of loading, to which each phase is connected, and which is placed at a potential which lies between the two operating potentials of the amplifier unit.

4. Apparatus in accordance with claim 3 wherein the amplifier unit comprises a separate power amplifier for each phase for regulating the control parameter, the separate power amplifiers forming H-bridge circuits.

5. Magnetic bearing apparatus in accordance with claim 1 comprising at least three position sensors for determining a radial position of the body in a stator system which is stationary relative to the stator.

6. Magnetic bearing apparatus in accordance with claim 5 comprising a position unit for converting the signals of the position sensors by a transformation into a two-component position signal of which one component represents the X coordinate and the other component represents the Y coordinate of the body in the stator system.

7. Magnetic bearing apparatus in accordance with claim 6 wherein the position unit monitors the functioning of the position sensors.

8. Magnetic bearing apparatus in accordance with claim 7 wherein, upon the occurrence of a fault, the position unit sets the signal of the associated position sensor to zero prior to the transformation.

9. Magnetic bearing apparatus in accordance with claim 8 wherein the position unit uses the signal of at least one of the position sensors for monitoring the functioning of the other position sensors.

10. Magnetic bearing apparatus in accordance with claim 7 wherein, upon the occurrence of a fault, the position unit selects another transformation for the determination of the position signal only with signals of fault-free position sensors.

11. Magnetic bearing apparatus in accordance with claim 5 wherein the three position sensors are arranged so that in each case two adjacent position sensors are mutually displaced with respect to a peripheral direction of the stator by an angle of 120°.

12. Magnetic bearing apparatus in accordance with claim 5 wherein the three position sensors are arranged so that, when viewed in a peripheral direction of the stator, an angle between a first and a second position sensor and the angle between the second and a third position sensor amounts in each case to 45° or 60°.

13. Magnetic bearing apparatus in accordance with claim 5 wherein each position sensor comprises first and second sensor elements which are arranged with a mutual displacement of 180° with respect to a peripheral direction of the stator.

14. Magnetic bearing apparatus in accordance with claim 1 which comprises a bearing-free motor in which the stator forms a bearing and drive stator and the body comprises a rotor for the bearing-free motor.

15. Magnetic bearing apparatus in accordance with claim 14 wherein the rotor has the shape of a disc or a ring.

16. Magnetic bearing apparatus for journalling a body comprising a stator with a control winding consisting of first, second and third loops only for producing a magnetic control field for regulating a position of the body relative to the stator, the first, second and third loops respectively belonging to different first, second and third electrical phases, a control device which in a first operating mode supplies each loop with a phase current or a phase voltage as a control parameter, a control unit for regulating the control parameter for each loop independently of the control parameters for the other loops, and a monitoring unit responsive to the occurrence of a fault in the first phase for switching the bearing apparatus, upon the occurrence of the fault, into a second operating mode in which the second and third fault-free phases only produce the magnetic control field.

* * * * *